US007058581B1

(12) United States Patent
Young

(10) Patent No.: US 7,058,581 B1
(45) Date of Patent: Jun. 6, 2006

(54) SYSTEM AND METHOD OF DISTRIBUTING AND RETURNING PRODUCTS

(75) Inventor: Bruce A. Young, LeMars, IA (US)

(73) Assignee: Ward Kraft, Inc., Fort Scott, KS (US)

( * ) Notice: Subject to any disclaimer, the term of this patent is extended or adjusted under 35 U.S.C. 154(b) by 0 days.

(21) Appl. No.: 09/467,994

(22) Filed: Dec. 20, 1999

(51) Int. Cl.
G06F 7/08 (2006.01)
H04B 11/38 (2006.01)
G07F 11/14 (2006.01)

(52) U.S. Cl. ............................. 705/1; 705/16; 705/21; 705/26; 235/381; 235/384; 700/236; 700/232; 40/454; 40/437; 379/114.01; 455/409; 455/405; 455/90; 221/7

(58) Field of Classification Search .................. 705/1; 455/90; 325/381; 221/7; 399/262
See application file for complete search history.

(56) References Cited

U.S. PATENT DOCUMENTS

| 4,598,810 A * | 7/1986 | Shore et al. ................ 194/205 |
| 4,839,505 A | 6/1989 | Bradt et al. |
| 4,858,743 A | 8/1989 | Paraskevakos et al. ..... 194/205 |
| 4,866,661 A | 9/1989 | de Prins |
| 4,995,498 A | 2/1991 | Menke ........................ 194/205 |
| 5,020,958 A | 6/1991 | Tuttobene ................... 414/281 |
| 5,028,766 A * | 7/1991 | Shah .......................... 235/375 |
| 5,159,560 A | 10/1992 | Newell et al. |
| 5,445,295 A | 8/1995 | Brown .......................... 221/3 |
| 5,482,139 A | 1/1996 | Rivalto ........................ 186/36 |
| 5,742,883 A * | 4/1998 | Girard et al. ............... 229/301 |
| 5,748,485 A | 5/1998 | Christiansen et al. .. 164/479.04 |
| 5,754,648 A | 5/1998 | Ryan et al. ..................... 380/4 |
| 5,769,269 A * | 6/1998 | Peters ............................ 221/7 |
| 5,791,991 A | 8/1998 | Small .......................... 463/41 |
| 5,812,641 A | 9/1998 | Kanoh et al. |
| 5,839,058 A * | 11/1998 | Phillips et al. .............. 455/409 |
| 5,909,638 A | 6/1999 | Allen ........................ 455/6.01 |
| 6,085,172 A * | 7/2000 | Junger ......................... 705/28 |
| 6,155,481 A * | 12/2000 | Rawlings .................... 229/300 |

FOREIGN PATENT DOCUMENTS

WO     WO 99/09499     2/1999

OTHER PUBLICATIONS

Joanne Tangorra-Publishers Weekly, v238, n48, p. 54(1), Nov. 1, 1991-Audio Rentals on the rise in Audio Stores.*

(Continued)

Primary Examiner—James P Trammell
Assistant Examiner—Daniel L. Greene
(74) Attorney, Agent, or Firm—Maier & Maier, PLLC

(57) ABSTRACT

The present invention comprises a product distribution and return system which includes a return mailer dispensed with a product from a vending machine. The product is returnable in the return mailer to a return center in another location. In another embodiment, a method of doing business is provided. In another embodiment, a method of renting products is disclosed. The method comprises consumer activity, wherein the consumer activity includes a vending machine transaction and a product return step. The method further comprises provider activity, wherein the provider activity includes return center activity and service agent activity. In another embodiment, an apparatus for dispensing products is disclosed comprising means for selecting a particular product, means for depositing the particular product together with a return mailer to a customer, and means for identifying the particular product and a rental date in a database.

23 Claims, 6 Drawing Sheets

OTHER PUBLICATIONS

Laura Dempsey-Dayton Daily News (DA)-Friday, Mar. 29, 1991-Edition: City Section: GOI p. 16 Stick it in Your Ears While Listening to a Good Book.*

Order House Fill Gaps in Film Collections-Arizona Republic (AR)-Friday Aug. 7, 1992, By: Jay Boyar, The Orlando Sentinel, Edition: Final Chaser Section: Weekend p. :D12.*

Jim Thompson, University of California, Riverside. Home Video Sources, http://web.archive.org/web/19980...edu/screensite/misc/vidlist. University of Alabama's Screensite. Home Film Festival, PO Box 2032 Scranton, PA 18501-2032 Have You Ever Said, "I Wish I Could See That Movie Around Here?".

* cited by examiner

SYSTEM AND METHOD OF DISTRIBUTING AND RETURNING PRODUCTS

FIELD

The present invention relates generally to product distribution, and more specifically to product distribution and return.

BACKGROUND

Many types of products are distributed to consumers on a rental basis. In particular, the popularity of renting media-based products, such as digital video disc (DVD) movies, video tapes, compact discs (CDs), software media, and so forth, continues to grow at a rapid pace. Typically, consumers rent products from a local store and then must return the products to the same store, i.e., to the point-of-rental. Alternatively, consumers can elect to purchase and keep these products.

Articles such as video tapes can also be rented from a machine, but the articles must still be returned to the machine, i.e., to the point-of-rental. Such machines are necessarily equipped with return bins to handle the returned articles.

Certain Internet-based companies allow a consumer to rent or buy media products on-line. Some of these companies offer services similar to book-of-the-month clubs in which a media product is periodically sent to a consumer on approval. The consumer can choose to keep the product for a period of time (or permanently), and pay the appropriate charges, or return the product and owe nothing. With this method of distribution, however, there is an inherent delay from the time the consumer selects a product to the time it is delivered to their home.

There is therefore a need in the art for a method of distributing products without delay, but which also provides a convenient means of returning the products.

SUMMARY

The present invention overcomes the problems of the art by providing in one embodiment a product distribution and return system. The system comprises a product and return mailer dispensed from a vending machine in one location, with the product returnable in the return mailer to a return center in another location.

In another embodiment, a method of doing business includes providing a product for rent at one location. The product is dispensed with a return mailer. The method further comprises requesting return of the product in the return mailer to another location within a period of time.

In another embodiment, a method of renting media products is disclosed which comprises consumer activity, wherein the consumer activity includes a vending machine transaction and a product return step. The method further comprises provider activity, wherein the provider activity includes return center activity and service agent activity.

In another embodiment, an apparatus for dispensing products is disclosed comprising means for selecting a particular product, means for depositing the particular product together with a return mailer to a customer, and means for identifying the particular product and recording a rental date in a database. In one embodiment, the apparatus is a vending machine.

DESCRIPTION OF EMBODIMENTS

In the following detailed description of embodiments, reference is made to the accompanying drawings which form a part hereof, and in which are shown by way of illustration specific embodiments in which the invention may be practiced. These embodiments are described in sufficient detail to enable those skilled in the art to practice the invention, and it is to be understood that other embodiments may be utilized and logical, structural, electrical, and other changes may be made without departing from the scope of the present invention.

Figure 1:
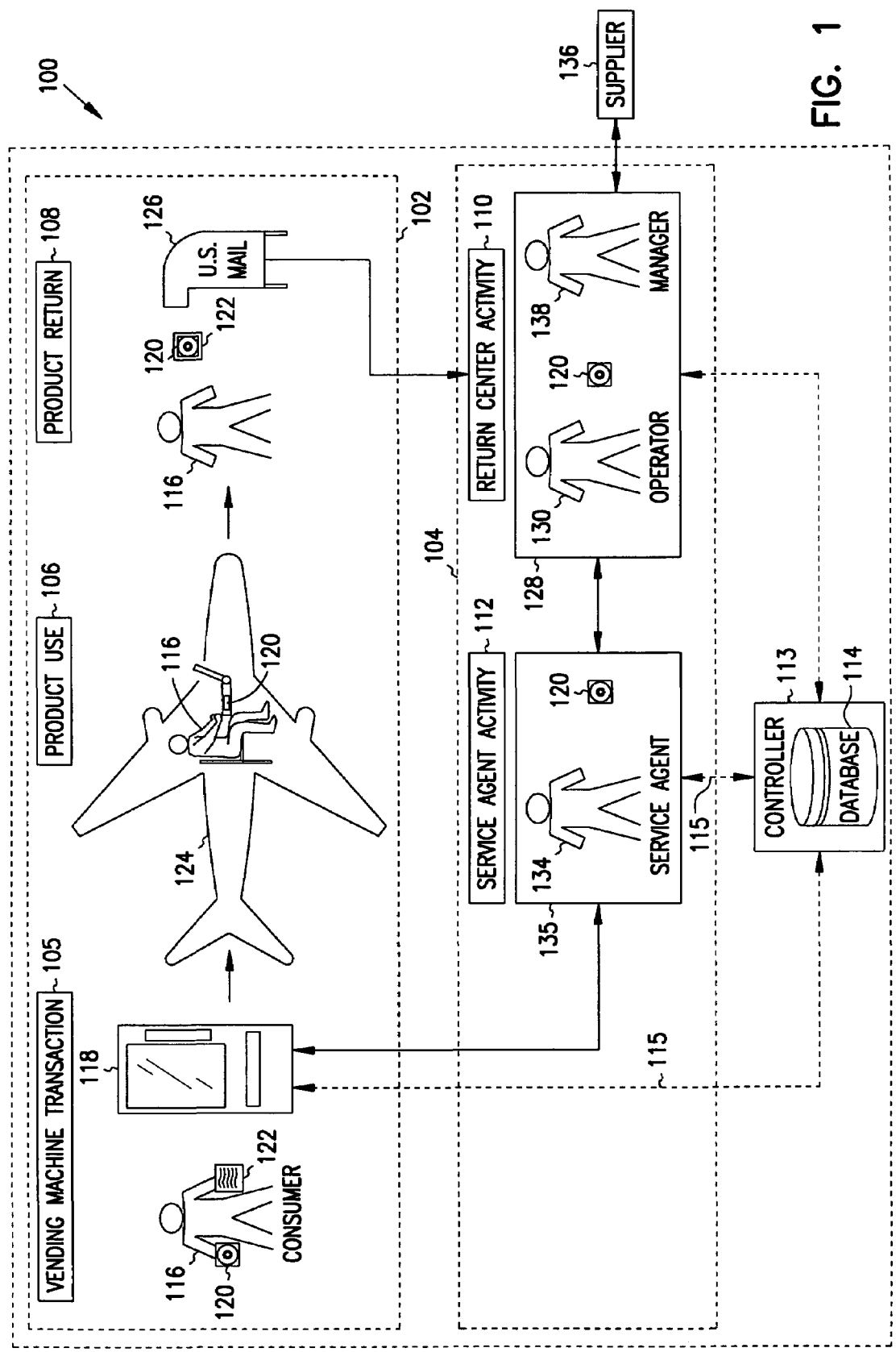
FIG. 1 is a simplified schematic diagram of a product distribution and return system in one embodiment of the present invention.

FIG. 1 is a simplified schematic diagram of one embodiment of a product distribution and return system 100 comprised of consumer activity 102 and provider activity 104. The consumer activity 102 includes a vending machine transaction 105, product use 106 and product return 108. The provider activity 104 includes return center activity 110 and service agent activity 112. The various activities are coordinated by a central controller 113 having a database 114. The central controller 113 is connected to the various components of the system 100 via suitable transmission links 115.

The vending machine transaction 105 involves a consumer 116 activating a vending machine 118 to acquire a product 120 and a return mailer 122. The vending machine 118 can be any type of machine capable of dispensing products after being activated through a suitable user interface, as described in FIG. 4.

In one embodiment, the consumer 116 uses a transaction card such as a credit or debit card to activate the machine. Information is entered by either swiping the card in a magnetic card reader or entering in an account number together with any other required information, such as an expiration date, personal identification number, etc. In another embodiment, a product debit card having a pre-purchased value can be used. In another embodiment, cash is used. The consumer 116 then selects a product 120 to rent or purchase. In one embodiment, the consumer can also select which third-party delivery service to use to return the product 120. In some instances, the choice of the delivery service may be dependent on the location from which the consumer intends to return the product 120, and information on the area of coverage for a particular delivery service is noted on the vending machine 118.

Figure 2A:
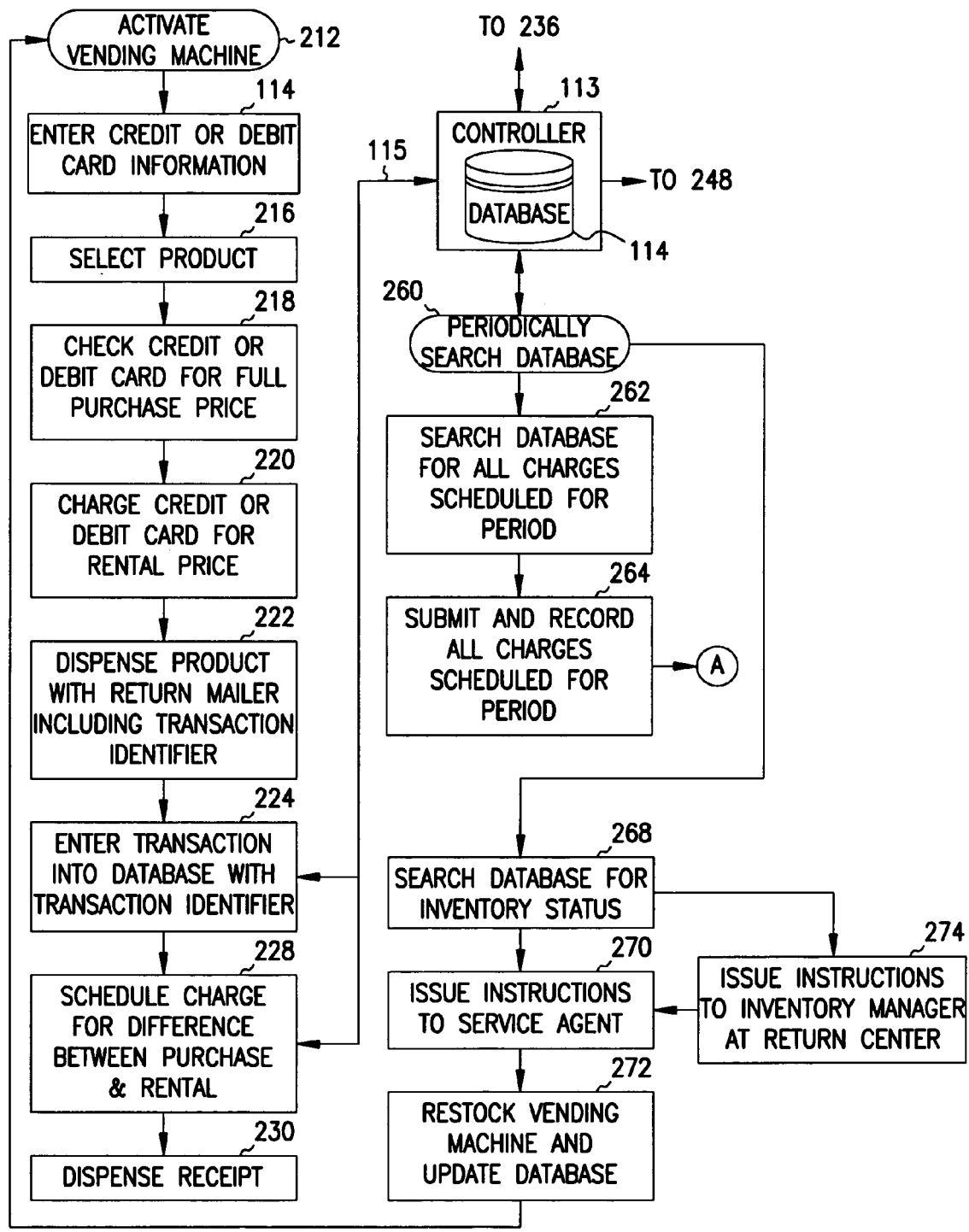
FIG. 2A is a first portion of a block diagram of a method of charging for a product that is distributed and returned in one embodiment of the present invention.
Figure 3A:
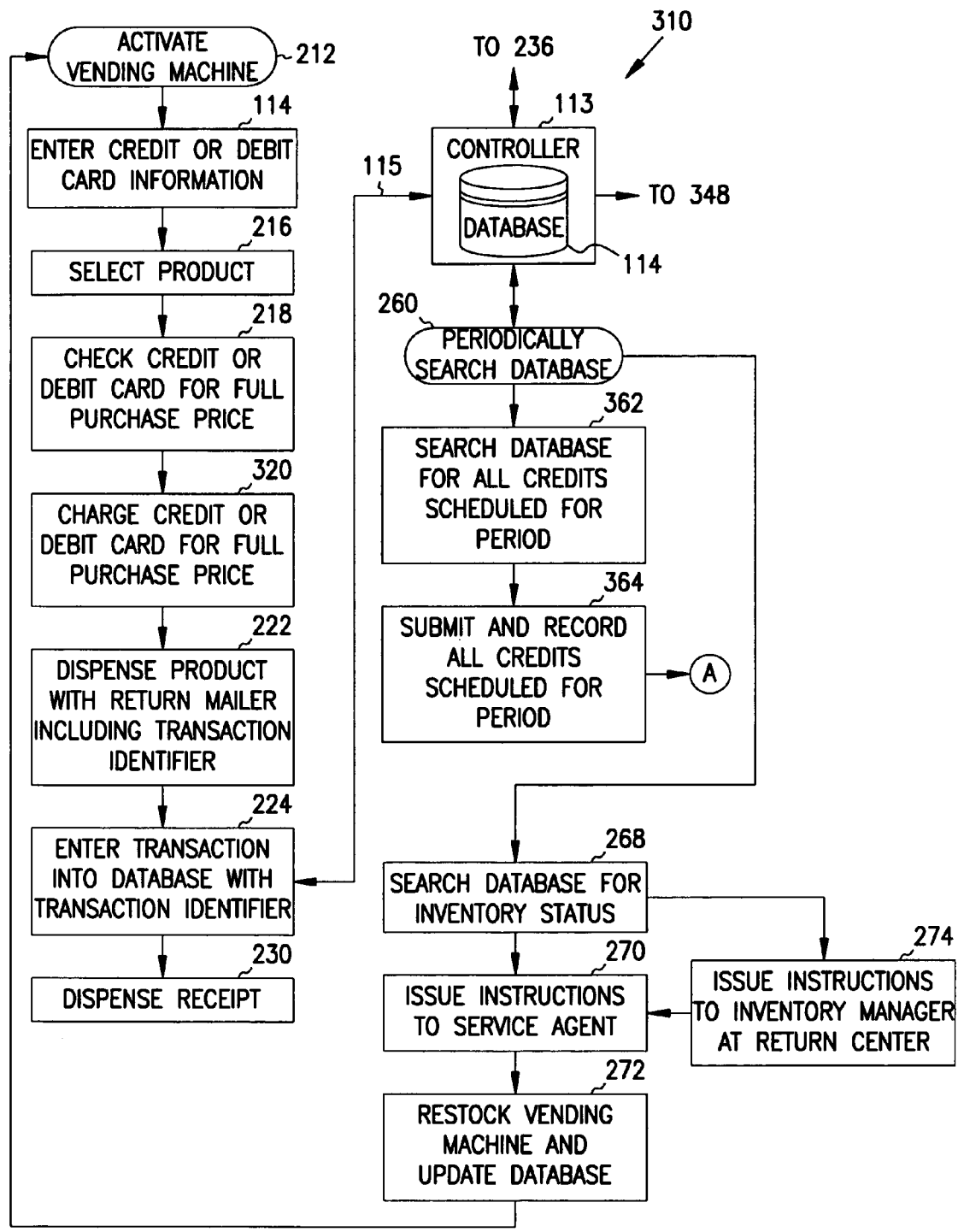
FIG. 3A is a first portion of a block diagram of an alternative method of charging for a product that is distributed and returned in one embodiment of the present invention.

The consumer 116 waits briefly while the transaction card is checked for authorization to charge as described in FIGS. 2A and 3A. The product 120 is then dispensed together with the return mailer 122. In one embodiment, the product 120 and/or the return mailer 122 can be labeled with a transaction identifier, such as a unique code. In another embodiment, the label can further contain a return center 128 address and have pre-paid postage or billing of any type. In one embodiment, the label is dispensed separately. The vending machine transaction 105 is entered into the database 114 as described in FIGS. 2A and 3A. A receipt can also be dispensed.

The vending machine 118 can be located virtually anywhere people congregate, including locations frequented by people who are away from home, such as airports, railroad stations, subways, bus stations, hotels, stores, and so forth. In locations such as these, the consumer 116 may be more likely to purchase products on impulse. In an alternative embodiment, the vending machine 118 is located at any public place in which such products are commonly purchased or rented, such as grocery stores, and so forth. In this way, the consumer 116 who may be planning to travel in the near future can have access to the products 120. The vending machine 118 can contain a selection of products the consumer 116 may be interested in either purchasing or renting. These can include, but are not limited to, DVD movies, audio CDs, software media, game media, videotapes, and so forth. Each product 120 can be labeled with both a purchase price and a rental price.

In the "product use" block 106, the consumer 116 uses the product 120 in any location desired, such as on an airplane 124. In this way, the consumer 116 can watch a chosen DVD movie, for example, at any time during a long trip. The movie can be started and stopped at any time, just as at home. When finished, the consumer 116 simply places the product 120 in the return mailer 122 and deposits it in an appropriate collection box for the specified third-party delivery service. In the embodiment shown in FIG. 1, the return mailer 122 has pre-paid United States (U.S.) postage, such that the consumer 116 can deposit the return mailer 122 in a "U.S. mail" mailbox 126, as shown in the "product return" step 108. This is unlike conventional media product rental arrangements in which the consumer is required to return the product to the point-of-sale or point-of-rental.

In one embodiment, the return mailer 122 is pre-printed with the address of a central return center 128, or a specific one of several return centers. It can have pre-paid U.S. postage as noted above, or can otherwise have some type of pre-paid billing or pre-arranged cash-on-delivery (COD) arrangement depending upon the third-party delivery service. In this way, the consumer 116 does not need to spend additional money to return the product 120 beyond what has already been charged to his account. In one embodiment, the cost of the postage is charged to the consumer 116 only when the return mailer 122 is used. If the address and billing information is provided on a separate label, the consumer 116 can wait to affix the label to the return mailer 122 until he is ready to use it. In this way, if circumstances change such that the consumer 116 decides to keep the product 120 (i.e., purchase it) or finds himself in an area where this type of postage is not as convenient to use or is otherwise not practical, he can keep the label for use on a future product 120. In the latter situation, the consumer 116 can purchase suitable postage for the return mailer 122 in order to return the product 120. In those embodiments where the consumer 116 has already been charged for the pre-paid postage, saving the label for use on a future rental has the added advantage of allowing the consumer 116 to forego paying for another pre-paid label when renting his next product 120.

In one embodiment, the return mailer 122 is shrink wrapped together with the product 120. The return mailer 122 can contain instructions detailing the process of returning the product, including the required return date, transaction identifier, and so forth. In a particular embodiment, the transaction identifier is printed in machine readable form suitable for scanning. In one embodiment, these instructions are printed on a separate sheet and/or on the product 120 itself. In one embodiment, the product 120 has a protective package, such as a jewel case for CDs and DVDs, which also serves as the return mailer 122. In another embodiment, a modified jewel case designed to resist cracking and breaking is used. The label for any type of see-through case can be designed to provide information as to the title, cost, and so forth, on one side, i.e., the side exposed in the vending machine 118. The reverse side can be the return mailing label with the appropriate shipping, billing and/or postage information.

Any known third party package delivery service, including but not limited to Federal Express, Airborne, United Parcel Service, the United States Postal Service, any international postal service, and so forth, can be used for return of the product 120 in the return mailer 122. In one embodiment, the choice of the delivery service is made by the provider. The criteria used to select a particular service can include, but is not limited to, the price charged per item returned, availability of drop-off points, traceability of packages, and reliability and availability of a particular service in a particular area. For international locations, any local delivery service can be used, including a foreign postal service.

In an alternative embodiment, local hotels can serve as drop-off points for the consumer 116. The hotel can provide a receipt that the product 120 was returned, thus taking over responsibility and liability for returning the product 120 to the return center 128. In this embodiment, the hotel can also be connected to the database 114, but the invention is not so limited. However, connection to the database 114, allows the hotel to issue credits or additional charges, in the same manner as the return center 128.

Once the consumer 116 returns the product 120, the only further involvement he may have with this transaction is to review and pay the charges when they appear on his credit card bill. Alternatively, if a debit card is used, he can review the charges posted against his personal account, such as a checking or savings account. If a pre-purchased electronic "product" card is used, the remaining value can be determined by inserting it in another machine or by calling a customer service center associated with the card, such as the return center 128.

The return center activity 110 begins when the return center 128 receives the product 120 returned in the return mailer 122. In one embodiment, the location for the return center 128 is chosen based on prevailing rent and wage rates, efficiency of delivery of the return mailers and inventory, proximity to other return centers, and a number of other factors. In one embodiment, there is only one return center 128. In another embodiment, there are two or more return centers 128. In another embodiment, there are any number of regional return centers 128 located in different parts of the United States and/or in different parts of the world. Machine operators 130 at the return center 128 log all incoming return mailers 122. In one embodiment, the return mailers 122 are logged by being scanned in and identified according to the unique transaction identifier noted above. Once this identifier is located, the specifics of the transaction are accessible in the database 114 and can be displayed to the machine operator 130.

The operator 130 can then open the return mailer 122, by manual, semi-automatic or automatic means. The operator 130 then needs to determine the condition of the product 120, whether it is the proper product and whether it was returned on time. The condition of the product 120 can be determined by any known means. Visual inspection can determine any gross defects that may be present. Other defects may require the use of a machine vision or machine testing system. For example, if the product 120 is a DVD or CD, a surface scan can be made to determine if there has been any scratching or warping of the product 120. Further, sampling of various tracks can be performed by reading the code in these sample areas. The sampling is then compared with a "golden" disk to determine the condition of the product 120.

In order to determine if this is the product 120 which this consumer 116 should have returned, a visual comparison is made between the contents of the return mailer 122 and what is being displayed on the screen. Further, the current date is compared with the date noted for return, and the amount of the delay, if any, is noted by the operator 130. The operator 130 makes an appropriate entry into the database 114 regarding the condition of the product 120, whether it is the proper product 120, and whether it was returned on time. If the product 120 has been returned late, the actual date of return can be noted and/or the number of days or hours it was late. Other information, such as an identifier for a product 120 that is not the appropriate or proper product, can also be entered. In one embodiment, the date for return is the drop-off date, rather than the actual date of receipt in the return center 128. The drop-off date can be determined by the postmark or otherwise by looking at shipping information noted with the return mailer 122. In one embodiment, shipping information is accessed from the third-party delivery service's database using the appropriate software. As a result of the entries made by the operator 130, the consumer 116 is either issued a credit or charged an additional amount as described in FIGS. 2B and 3B.

The return center 128 also maintains an inventory of products. It periodically receives additional replacement products from one or more suppliers 129 to augment the returned rental products. It also receives products 120 removed from the vending machines 118 by service agents 134. Products 120 leaving the return center 128 are either sent to service agents 134, returned to the supplier 136 for credit, and so forth, as needed.

This and other return center activity 112 can be coordinated by the central controller 113. In one embodiment, the central controller 113 issues instructions to a manager 138 regarding inventory management. Instructions can include information on which products to order from the supplier 136, which products to send to a particular service agent 134, which products to return to the supplier 136 for credit, and so forth. Instructions can also include information on sending non-returnable products, such as obsolete products, to the purchaser of such products.

The service agent activity 112 includes receiving products at a service agent facility 135 from the return center 128. The service agent facility 135 can be any type of structure, such as a small storage facility or even a private home. The service agent activity 112 further includes placing products in an appropriate vending machine 118, although these are not necessarily the identical products that were rented from a given vending machine 118. In many cases, these will be products having the same titles, although periodically certain titles will be discontinued or reduced in number and new titles added. The service agent 134 can be an employee or independent contractor and is responsible for servicing one or more vending machines 118. In one embodiment, the service agent 134 maintains a stock of products 120 in the service agent facility 135 to be used when needed.

In another embodiment, when products 120 are bar coded or otherwise uniquely and machine readably identified as described above, current dates, return dates, and various database entries are entered automatically through the use of an automated service agent. An automated service agent in one embodiment includes a machine capable of reading bar codes of products such as when the products are passed on a conveyer belt over a bar code scanner or the like. Such an automated service agent performs the functions of sorting, scanning, and the like, in one embodiment robotically. Products 120 are scanned or otherwise identified by the automated service agent to determine the relevant parameters.

The service agent 134 also periodically receives instructions from the return center 128 with information as to what products to remove from the vending machine 118, what products to place in the vending machine 118, and what products to return to the return center 128. Such changes can be based on any number of factors, such as consumer demand, a change or update to the titles being offered, and so forth. Additionally, if the vending machine 118 needs supplies, such as ink, mailers, etc., instructions can be issued on these items as well. This allows the service agent 134 to take only as much product and supplies as are needed by the vending machine 118 on any one visit. The instructions can be in the form of e-mail or via any other known means of communications. Once the instructions have been performed, the service agent 134 makes appropriate entries in the database 114 to indicate what changes have been made.

In one embodiment, the entries can be made directly from the vending machine 118 using a suitable transmission link 115. In this way, the vending machine 118 is kept up-to-date as to the products 120 available. In another embodiment, the information is entered into the database 114 using any suitable electronic terminal, such as a portable terminal, connected directly to the controller 113 via a transmission link 115. In one embodiment, there are separate nodes between the transmission links 115 and the central controller 113. The nodes handle interfacing between a particular transmission link 115 and an information source, such as the vending machine 118. The node can be a computer, microprocessor, or any other suitable type of device having input and output capability.

Each transmission link 115 can be any suitable type of wired or wireless medium using any suitable bandwidth over which information can be transmitted. This includes, but is not limited to, a parallel connection, a serial connection, thin or thick coaxial cable, twisted-pair wiring, copper wiring, a fiber-optic cable, including electro-optical fibers and integrated-optical fibers, a wireless connection using transmissions such as infrared or radio frequency (RF), and so forth. Each transmission link 115 can send and receive signals over any type of network operatively connected to the central controller 113, including alternating current (AC) wiring, telephone wiring or conventional cable TV wiring. In another embodiment, the network is a local area network (LAN) or wide area network (WAN) or the Internet.

The central controller 113 may be a local or remote receiver only, or any type of server or computer. In another embodiment, the central controller 113 represents a collection of controllers 113 in various locations. In embodiments where no node is used, the central controller 113 can include a transceiver and one or more multiplexed analog-to-digital converters to read and convert vending machine output directly. In one embodiment, the central controller 113 is a personal computer having all necessary components for processing the input signals and generating appropriate output signals as is understood in the art. These components can include a processor, a utility, a driver, an event queue, an application, and so forth, although the invention is not so limited. In one embodiment, these components are all computer programs executed by a process of the computer, which operates under the control of computer instructions, typically stored in a computer-readable medium, such as a memory. In this way, useful operations on data and other input signals can be provided by the computer's processor. The central controller 113 also desirably includes an operating system for running the computer programs, as can be appreciated by those skilled in the art.

The central controller 113 can be a database server which maintains the database 114. In an alternative embodiment, the server implementing the inventory control system can be a separate computer with access to the database, rather than the database itself. In one embodiment, the database 114 contains information on all vending machine transactions 105, return center activity 110 and service agent activity 112. The database 114 can also maintain an inventory status for each vending machine 118, each service agent facility 135 and the return center 128. The central controller 113 can then issue the appropriate instructions to each service agent 134 as well as to an inventory manager 138 at the return center 128, as noted above.

Figure 2B:
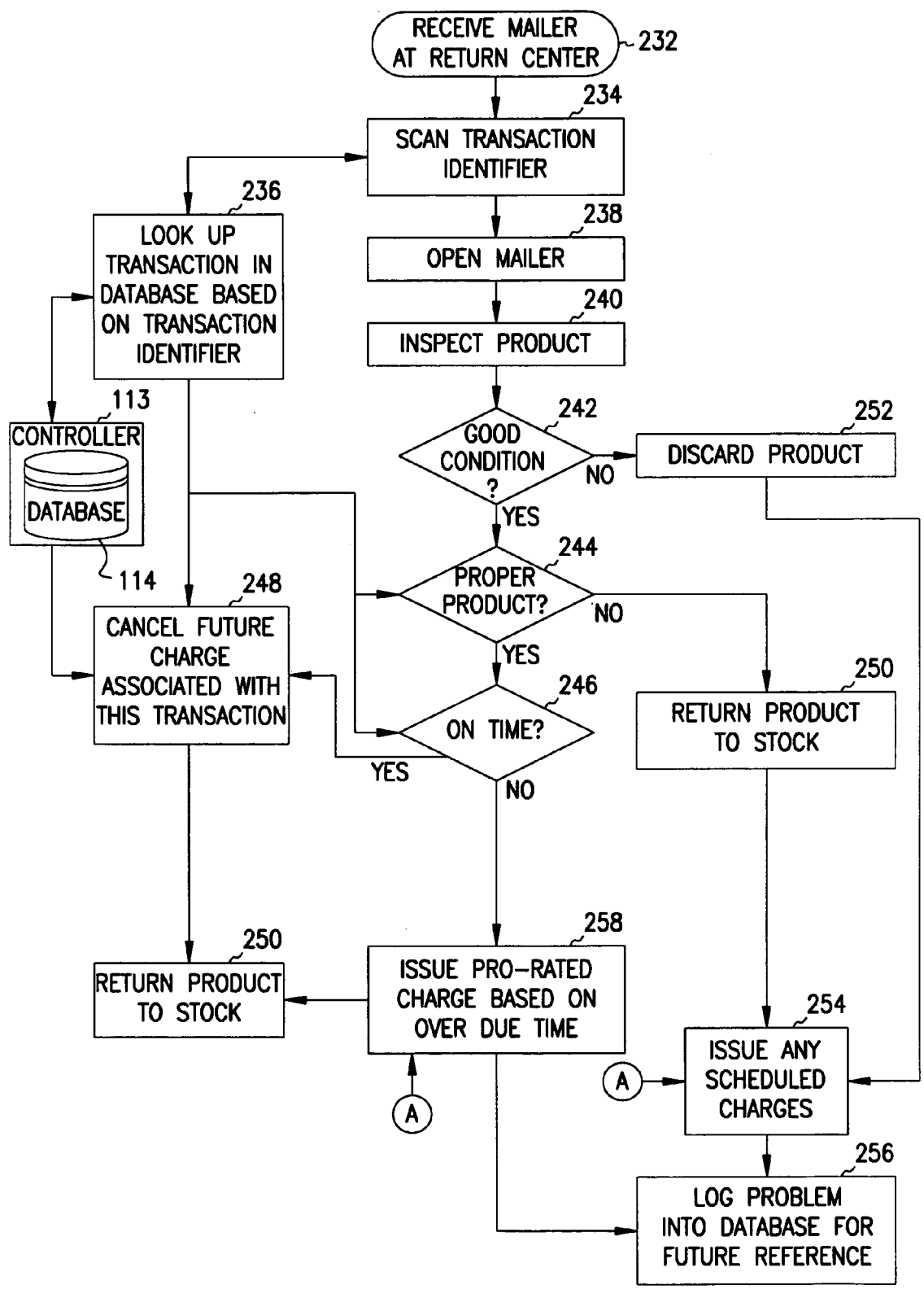
FIG. 2B is a second portion of the block diagram of the method of charging for a product that is distributed and returned in one embodiment of the present invention.

FIGS. 2A and 2B show block diagrams of a method of distributing and returning products according to one embodiment of the present invention. The method begins when a vending machine containing products, such as media products, is activated 212 by a consumer. The consumer can enter credit or debit card information (114) as described above. The consumer then selects 216 a product to rent or purchase. The credit or debit card is checked 218 for authorization to charge with the amount of the purchase price according to conventional means. For example, a modem in the vending machine 118 can automatically dial a credit verification service to obtain approval. In this embodiment, the credit or debit card is then charged 220 a rental price. By pre-authorizing the full amount, however, additional charges are more likely to be approved if the consumer fails to return the product, or returns it late or damaged. If the consumer has selected a purchase option, however, the credit or debit card can be charged the full purchase price immediately.

The product is dispensed 222 together with the return mailer including a transaction identifier, such as a unique code. If the consumer has selected the purchase option, no return mailer needs to be dispensed. In one embodiment, the consumer wants to rent, but can choose to not pay extra for pre-paid postage because he intends to use a pre-paid label or mailer from an earlier transaction, as discussed above. In such an embodiment, a non pre-paid return mailer can still be dispensed, if desired. In another embodiment, the return mailer is a pre-paid return mailer or the pre-paid information can be included on a separate label as discussed above.

The transaction is entered 224 into the database 114 and identified in some manner, such as with the transaction identifier. In addition to the unique code, information entered into the database 114 can include identifiers for the particular vending machine, information on the product purchased or rented, amount of purchase or rental, credit or debit card information, and so forth. Additional information can include any discount or coupon information, time and date of the transaction, or other information as desired. If the rental option has been selected, a charge against the credit or debit card can be scheduled 228 for the difference between the purchase and rental price at a fixed date in the future. A receipt can be dispensed 230 reflecting the amount charged to the credit or debit card. The receipt can also contain information as to the additional amount which will be charged to the card if the product is not returned. The receipt can further contain the unique code identifying this transaction, vending machine location, customer service contact information, including phone, web address, e-mail address, street address, fax number, and so forth, for the provider.

In most situations, the consumer then uses the product in any desired location. After a period of time, the consumer can return the product in the return mailer. As shown in FIG. 2B, upon being received 232 in the return center, the transaction identifier is scanned 234 and the transaction is looked up in the database based on the transaction identifier 236. The mailer is opened 238 and the product is inspected 240 to determine 242 if it is in good condition. If it is in good condition, a determination 244 is made as to whether or not it is the proper product. If it is the proper product, a determination 246 is made as to whether or not the product has been returned on time. If it has been returned on time, all future charges associated with this transaction are canceled 248. The product is then returned 250 to stock to be used again.

If the product is not in good condition, it is discarded 252. Any scheduled charges are issued 254 to the consumer's credit or debit card. This problem is logged 256 into the database for future reference. If the product is in good condition, but is not the proper product, it is returned to stock 250. Optionally, if the product was returned in error and is not a part of the inventoried stock, it can be returned to the proper owner if the actual owner is identifiable. Alternately, the product can be discarded if the owner is not identifiable or the product is otherwise not suitable for any reason. However, the appropriate charges are issued 254 and the particular problem regarding the product is logged into the database 256 as above.

If the product is in good condition and is the proper product, but has not been returned on time, a pro-rated charge based on the overdue time is issued 258 to the consumer and the product is returned 250 to stock. Optionally, this problem can be logged 256 in the database for future reference.

Referring again to FIG. 2A, periodically, the database 114 is searched 260 for information. The database 114 can be searched 262 for all charges scheduled for a period of time. The period of time can be weekly, daily, or more often, as the situation warrants. All charges for the specified period are then submitted and recorded 264 in the database. The specified charges are then issued (254 or 258) to the consumer as discussed above in FIG. 2B. (See link "A" on FIGS. 2A and 2B). Charges can be issued to the consumer via mail or any other suitable means.

The database 114 can also be searched 268 for inventory status. The inventory status can be determined for each vending machine, return center, as well as any service agent facilities. Based on the information obtained with the search, the central controller 113 can issue service agent instructions 270 and inventory manager instructions 274 as described in FIG. 1. The vending machine is restocked and the database 114 is updated in block 272.

Figure 3B:
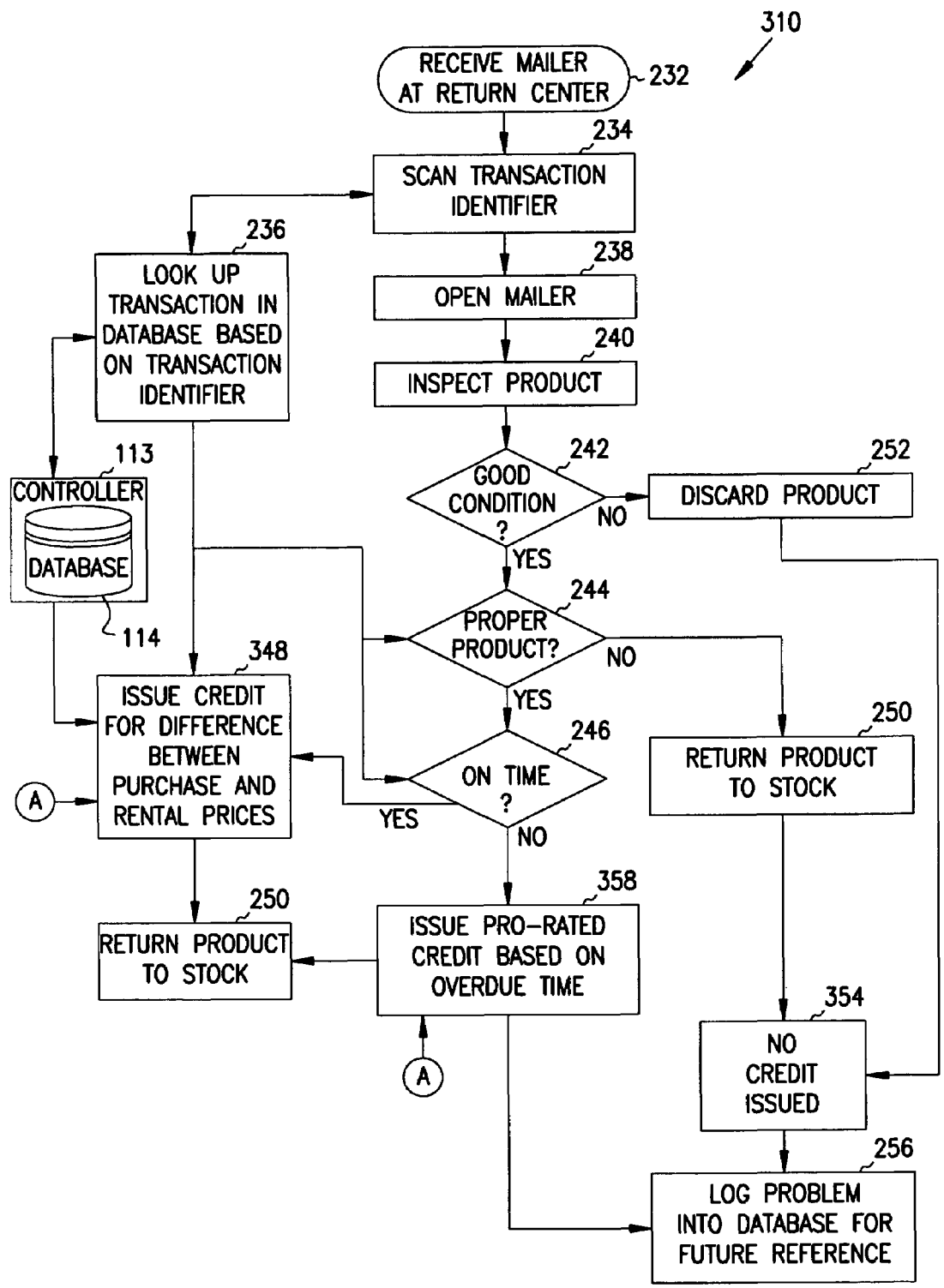
FIG. 3B is a second portion of the block diagram of the alternative method of charging for a product that is distributed and returned in one embodiment of the present invention.

FIGS. 3A and 3B show an alternative method 310 of distributing and returning products in which the credit or debit card is charged 320 for the full purchase price regardless of whether the consumer choose the rent or purchase option. Otherwise, the process flow for the vending machine transaction remain the same as in FIGS. 2A and 2B, with the exception that there is no charge scheduled (228) for the difference between purchase and rental prices. The return mailer dispensed at 222 can have instructions on how to obtain full credit for rental of the product. As shown in FIG. 3B, the mailer is returned 232 as before. Similarly, the product is inspected at 240 and determinations 244 and 246 are made as to whether it is the proper product and whether it was returned on time. If these conditions are met, a credit is issued 348 for the difference between the purchase and rental prices.

If the product is not in good condition, it is discarded 252 as shown in FIG. 3B. In this case, no credit is issued 354 to the consumer's credit or debit card. The problem is then logged 256 into the database for future reference as in FIG. 2B. If the product is in good condition, but is not the proper product, again it is returned 250 to stock. Again, no credit is issued 354 and the problem is logged 256 into the database as above. If the product is in good condition and is the proper product, but was not returned on time, a pro-rated "credit" based on the overdue time is issued 358 to the consumer. This is in contrast to the pro-rated "charge" 258 shown in FIG. 2B for an overdue return. As before, the product is returned 250 to stock and the problem can optionally be logged 256 in the database for future reference.

FIG. 3A shows the periodic search 260 of the database as described in FIG. 2A. However, in this embodiment, scheduled "credits" for the period are searched 362 and then submitted and recorded 364. The specified credits are then issued (348 or 358) to the consumer as shown in FIG. 3B. (See link "A" on FIGS. 3A and 3B).

Figure 4:
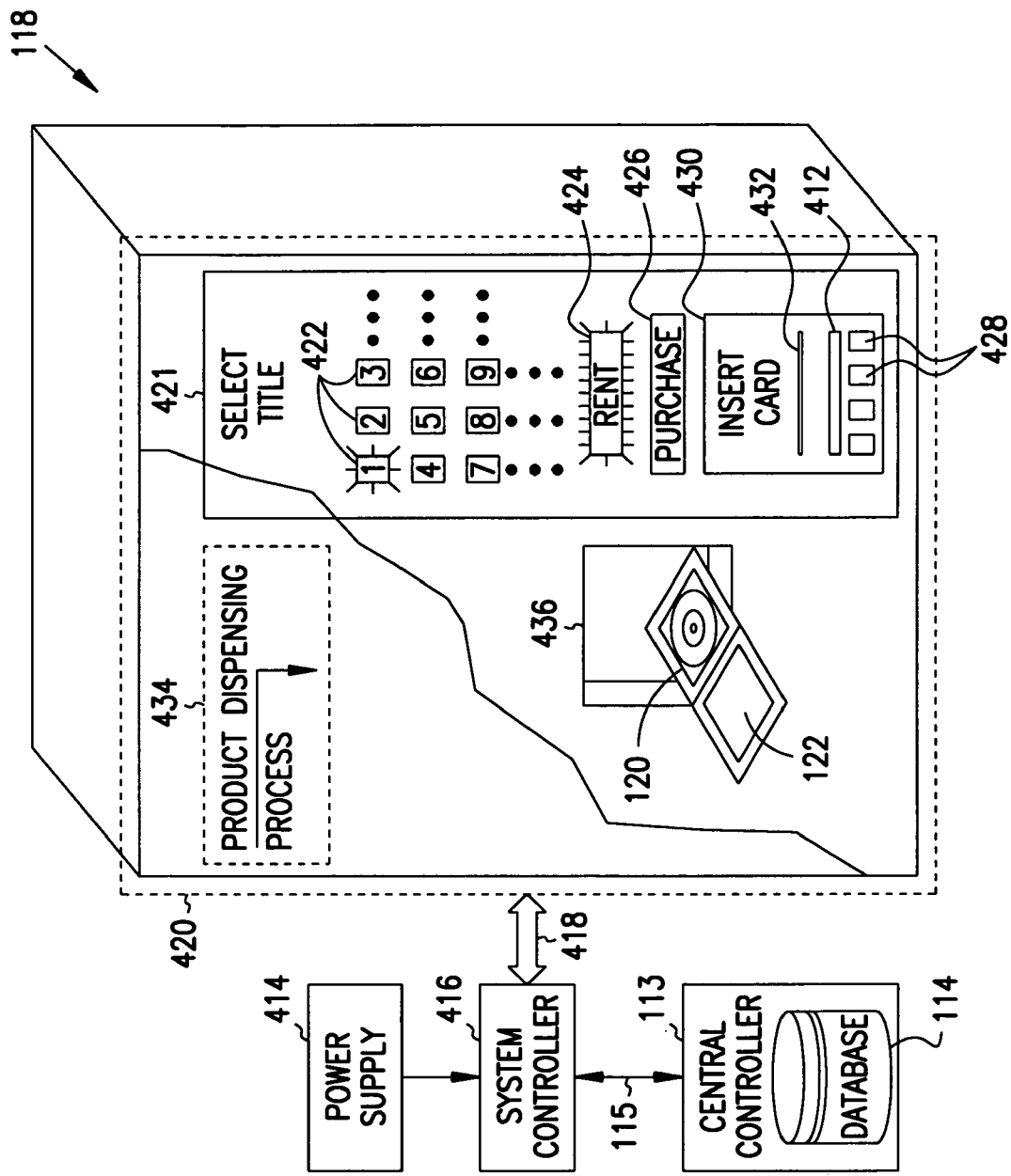
FIG. 4 is a simplified schematic view of a vending machine apparatus for dispensing products in one embodiment of the present invention.

FIG. 4 shows one embodiment of a vending machine 118 that is connected to a database 114. The vending machine 118 can contain any known user interface, which can be any type of communication device or transceiver, including, but not limited to, any type of telephone, key pad, keyboard, touch screen, and so forth. In one embodiment, the user interface is comprised of a simple keypad with a single line display. In another embodiment, the user interface comprises a telephone into which the consumer can speak in order to ask or answer questions, issue commands, and listen for responses. Such responses can be in the form of a computer-generated "voice" alone or in combination with a visual display. In an alternative embodiment, the user interface is only an input device, such as a magnetic card reader in combination with a suitable control panel. In this embodiment, the output signal can be viewed on the visual display. In another embodiment, a full electronic kiosk with a multi-media touch-screen is used. In this embodiment, the consumer 116 can preview selections or otherwise interactively select the product 120.

The vending machine 118 can further include any known technology for dispensing products 120, such as a glass-front spiral-type dispenser or any other more sophisticated type of dispenser associated with an electronic kiosk, and so forth. The vending machine 118 is equipped with all necessary components and electronics known in the art, such as a selection arm similar to a juke-box mechanism. A machine for dispensing products, such as media products, is described in U.S. Pat. No. 5,020,958 to Tuttobene (Tuttobene). In Tuttobene the vending machine is set up to handle dispensing and return of products to internal storage bins. U.S. Pat. No. 4,558,743 to Paraskevakos describes a vending machine and method for automatic vending of merchandise, but also includes means for returning the merchandise to the vending machine.

The vending machine 118 can be operated via any suitable means and has suitable mechanical and electrical means to operate properly. The vending machine 118 can have a magnetic card reader or electronic card interface 412 to accept electronic forms of payment, such as debit and credit cards, as described above. Additionally, the vending machine 118 can be designed to accept cash, such that there is a money interface through which bills or change can be placed and a conventional coin return.

In the embodiment shown in FIG. 4, the vending machine 118 comprises a power supply 414, a system controller 416, a data bus interface 418, and a system unit 420. In this embodiment, the system controller 416 comprises a computer processor, nonvolatile memory, input device and monitor. The system controller 416 can be coupled to the central controller 113 via a transmission link 115 as described above. The system controller 416 can further be coupled to various sensing devices, to monitor certain variables, process the variables, and output control signals to control devices to take necessary actions when the variable levels exceed or drop below selected or predetermined value. In one embodiment, total product weight is monitored. In this way, it can be determined if the vending machine 118 is overloaded and needs to be temporarily shut down, or otherwise is low on products and in need of refilling. The non-volatile memory may comprise a disk drive or read only memory device which stores a program to implement the above control and store appropriate values for comparison with the process variables as is well known in the art.

In a further embodiment, the system controller 416 may comprise a machine coupled to a control panel 421. Buttons can be provided on the control panel 421 so that the consumer has a number of choices available. As shown in FIG. 4, such buttons can include, for example, "product title" buttons 422, a "rent" button 424, a "purchase" button 426, and "electronic card buttons" 428 which operate an electronic card system 430 that includes the electronic card interface 412 and a receipt dispenser 432. Other buttons not shown can include a "third-party delivery service" button or a "pre-paid postage" option. Devices that receive signals from the system controller 416 include all of the devices which are required to operate a product dispense process 434.

In one embodiment, the system unit 420 comprises all of the devices or machinery, including consumer interface features, needed to operate the vending machine 118. These devices can include, for example, a product drop, package drop, conveyor, carrier device, product dispenser, packaging dispenser and receipt dispenser. These devices can also include a label dispenser and a label applicator.

Assuming the power supply (or energy supply) 414 is already turned on, the product dispense process 434 is activated when a consumer inserts a suitable magnetic card, such as a credit or debit card, etc. in the electronic card interface 412 (or deposits a specific amount of money in a money interface). The consumer can then press a title button 422 to select a desired title for a DVD movie, for example, and select either the rent button 424 or purchase button 426, as desired. In the embodiment shown in FIG. 4, the consumer has selected to "rent" title "1". Although FIG. 4 shows only nine different title buttons 422, namely "1" through "9," in practice, any number of title buttons 422 can be offered. In an alternative embodiment, the consumer can select more than one product 120 at additional cost. The product 120 is dispensed through a dispenser 436 as shown. In this embodiment, the return mailer 122 is integral with the product case.

The product dispense process 434 can be any suitable type of product dispense process for dispensing products from a vending machine, as is known in the art. Additionally, the vending machine 118 in the present invention also dispenses a suitable return mailer that can be separate from or integral with the product 120 as discussed above.

The product dispense process 434 can take any suitable amount of time to complete for any one transaction. In one embodiment it takes from about less than 20 seconds to about one (1) minute or more from the time the consumer inserts his electronic card, until the product 120 and return mailer 122 enter the dispenser 436.

The embodiments of the present invention have a number of advantages over other known computer configurations. For example, by providing a return mailer together with the product, it is now possible for a consumer to rent a product in one location and return it from another location to a designated return center in yet another location. This provides convenience and flexibility for the traveling consumer. By providing pre-paid and pre-addressed return mailers, the convenience for the consumer is further enhanced.

Further advantages of the system includes use of a service agent to receive supplies from the return center for restocking of particular vending machines. Additionally, use of a central database to record each transaction, as well as the condition and timeliness of the return, allows the provider to maintain accurate records of the consumer's transactions as well as maintain an inventory status. The database also allows instructions to be issued to the service agent and to a return center manager, to further help with inventory management.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the following claims, and the full scope of equivalents thereof.

What is claimed is:

1. A product distribution and return system, comprising:
a vending machine configured to dispense media products;
a product dispersed from the vending machine in one location, the product being one of said media products;
a return mailer dispersed with the product, wherein the return mailer is also a product case, the product returnable in the return mailer to a return center, the return center being in another location, and
a label comprising an address of the return center and having an amount of postage sufficient to mail the product to the return center;
a database with information associated with the product, wherein said label is configured for being attached to the return mailer for returning the product tot the return center or alternatively being attached to a second return mailer if the product is not returned to the return center;
wherein a transaction identifier alerts the return center that the pre-paid package is returned;
wherein a product rental fee is defined in a set of product rental terms, further wherein the product rental fee includes fees for non-compliance with the product rental terms;
wherein the return center determines compliance or non-compliance with the product rental terms, further wherein an additional charge is posted to a consumer account or a future credit to a consumer account is canceled for non-compliance with the product rental terms;
wherein the product rental terms include terms related to a specified return date and product condition; and
wherein the database contains information specifying at least four of the product rental terms selected from the group consisting of transaction identifier, product title, product dispense date, specified return date, product condition, product rental fee and product purchase price.

2. The system of claim 1 further comprising a controller containing the database with information on the product, the controller connected to the vending machine and to the return center with transmission links.

3. The system of claim 1 wherein the media product is selected form the group consisting of DVDs, CDs, videotapes, software media and audio tapes.

4. The system of claim 1 wherein the product is rented using a transaction card.

5. The system of claim 1 wherein the vending machine is located in a location selected from the groups consisting of an airport, a railroad station, a bus station, a subway, a store and a hotel.

6. The system of claim 1 wherein the product is obtained in a first location, used in a second location and deposited in a collection box in a third location.

7. The system of claim 2 further comprising a service agent facility having an automated service agent, the automated service agent having means for accessing the database.

8. The system of claim 7 further comprising instructions issued by the controller to the return center and to the service agent facility, the instructions providing information on inventory management.

9. The system of claim 1 further comprising a transaction identifier on the return mailer.

10. The system of claim 9 wherein the transaction identifier is a scannable code.

11. The system of claim 10 wherein the return mailer has prepaid postage and is pre-addressed to the return center.

12. The system of claim 1 wherein the product is not returned to the return center.

13. The system of claim 1 wherein the database contains information comprising a transaction identifier, product title, product dispense date, specified return date, product condition, product rental fee and product purchase price.

14. The system of claim 13 wherein the return center determines compliance with the specified return date by noting the actual return date and comparing the actual return date with the specified return date in the database.

15. A method of doing business, comprising:
providing a vending machine configured to dispense media products;
providing a media product for rent at the vending machine in one location;
dispensing the media product from the vending machine, the media product being dispensed with a return mailer, wherein the return mailer is configured as a product case;

requesting return of the media product in the return mailer to a return center located in a location other than said one location within a period of time, the return mailer depositable with a third-party delivery service;

updating the database of on the return of the media through electronic notification;

tracking the return of the media to at the return center;

storing information about the media product rental terms in a database; and providing a label comprising an address of the return center and having an amount of postage sufficient for the third-party delivery service to return the product to the return center;

wherein said label is configured for being attached to the return mailer upon returning the product to the return center or alternatively for being attached to another return mailer if the product is not returned to the return center; and wherein the database contains at least four of the media product rental terms selected form the group consisting of a transition identifier, product title, rental date, specified return date, product condition, product rental fee and product purchase price.

16. The method of claim 15 wherein a unique code identifies the media product, rental location and the rental date.

17. The method of claim 16 further comprising storing information about the media product, rental location and rental date in the database.

18. The method of claim 17 further comprising issuing credit or canceling additional charges depending on product condition and product return date.

19. The method of claim 16, wherein the return center activity comprises:

opening the return mailer;

inspecting the product inside the return mailer to determine if the product is in good condition;

comparing information in the database with the product inside the return mailer; and issuing a credit for a difference between the product rental fee and the product purchase price or canceling a future charge when the product is returned in good condition and on time.

20. The method of claim 19 wherein a prorated credit is issued when the product is returned late or in less than good condition.

21. An apparatus for dispensing media products, comprising:

means for selecting a particular product;

means for dispensing the particular product together with a first return mailer to a customer;

means for transporting the particular product from the customer back to a return center located apart from the means for dispensing;

means for identifying the particular product;

means for recording a transaction date in a database; and amount of postage sufficient to mail the particular product to the return center;

means for notifying the return center that the product has been returned;

means for tracking the product from the return center after it has been returned;

wherein said label is configured for being attached to the first return mailer for returning the particular product to the return center or alternatively for being attached to a second return mailer if the particular product is not return to the return center;

wherein said particular product is a media product and said means for transporting comprises the first return mailer dispersed at said means for dispersing; and wherein the database contains information specifying at least four product rental terms selected form the group consisting of a transaction identifier, product title, product dispense date, specified return date, product condition, product rental fee and product purchase price.

22. The apparatus of claim 21 wherein the means for selecting and depositing a particular product is a vending machine.

23. The apparatus of claim 22 wherein the means for identifying the product and rental date is a unique code, the unique code enterable in the database.

* * * * *